United States Patent
Burrowes et al.

(10) Patent No.: US 7,655,729 B2
(45) Date of Patent: Feb. 2, 2010

(54) POWER TRANSMISSION PRODUCTS HAVING ENHANCED PROPERTIES

(75) Inventors: George Burrowes, North Canton, OH (US); Mike Gregg, Lincoln, NE (US)

(73) Assignee: Veyance Technologies, Inc., Fairlawn, OH (US)

( * ) Notice: Subject to any disclaimer, the term of this patent is extended or adjusted under 35 U.S.C. 154(b) by 107 days.

(21) Appl. No.: 11/290,232

(22) Filed: Nov. 30, 2005

(65) Prior Publication Data

US 2006/0148990 A1  Jul. 6, 2006

Related U.S. Application Data

(63) Continuation-in-part of application No. 11/026,769, filed on Dec. 31, 2004.

(51) Int. Cl.
  C08L 23/04 (2006.01)
  C08L 23/10 (2006.01)
  C08L 25/00 (2006.01)
  C09J 91/06 (2006.01)
  F16G 1/00 (2006.01)
  F16G 1/02 (2006.01)

(52) U.S. Cl. .................. 525/191; 525/211; 525/232; 525/240; 524/274; 524/275; 474/264; 474/271

(58) Field of Classification Search .......... 525/236, 525/240, 242, 245, 263, 285, 191, 211, 232; 524/274, 275; 474/191, 264, 271
See application file for complete search history.

(56) References Cited

U.S. PATENT DOCUMENTS

| | | | |
|---|---|---|---|
| 2,683,141 A | 7/1954 | Erchak, Jr. | |
| 3,060,163 A | 10/1962 | Erchak, Jr. | |
| 4,128,523 A | 12/1978 | Britton et al. | |
| 4,506,056 A * | 3/1985 | Gaylord | 524/445 |
| 4,990,568 A * | 2/1991 | Benefield et al. | 525/232 |
| 5,216,074 A * | 6/1993 | Imai et al. | 525/66 |
| 5,238,731 A | 8/1993 | Blanch et al. | |
| 5,610,217 A * | 3/1997 | Yarnell et al. | 524/397 |
| 5,905,106 A * | 5/1999 | Prigent et al. | 524/430 |
| 6,153,704 A * | 11/2000 | Kodama et al. | 525/240 |
| 6,251,977 B1 * | 6/2001 | Georget et al. | 524/397 |
| 6,491,598 B1 * | 12/2002 | Rosenboom | 474/260 |
| 6,491,992 B1 * | 12/2002 | Koizumi et al. | 428/34 |
| 6,561,937 B1 | 5/2003 | Wegele | |
| 6,695,734 B2 | 2/2004 | Hedberg et al. | |
| 2005/0288439 A1 * | 12/2005 | Pazur et al. | 525/191 |
| 2006/0100377 A1 * | 5/2006 | Ouhadi | 525/191 |

* cited by examiner

*Primary Examiner*—Nathan M Nutter
(74) *Attorney, Agent, or Firm*—Alvin T. Rockhill; Kathleen K. Bowen

(57) ABSTRACT

The present invention is directed to the incorporation of functionalized polyethylenes, in amount of about 1% to 95% by weight based upon the weight of the total crosslinkable material, into ethylene alpha olefin elastomers, such as EPDM elastomer compositions, which are crosslinked by peroxides, which results in improved properties, such as hardness and modulus of elongation, and can result in improved higher abrasion resistance, wear resistance, coefficient of friction, tensile strength, and other properties through a broad temperature range, which are beneficial to power transmission products, such as power transmission belts.

20 Claims, 2 Drawing Sheets

POWER TRANSMISSION PRODUCTS HAVING ENHANCED PROPERTIES

RELATED APPLICATION DATA

This application is a continuation-in-part of co-pending U.S. patent application Ser. No. 11/026,769, filed Dec. 31, 2004, from which this application claims priority.

BACKGROUND OF THE INVENTION

The present invention is directed to improved ethylene-alpha-olefin elastomers, especially EPDM-based elastomers, for use in manufacturing power transmission products, such as power transmission belts, timing belts, and the like. More specifically, the invention is directed to such elastomers which incorporate certain types of functionalized polyethylenes which result in belts having enhanced physical properties.

Power transmission belts are known. See for example, U.S. Pat. No. 6,561,937 (Wegele); U.S. Pat. No. 6,695,734 (Hedberg et al); U.S. Pat. No. 5,610,217 (Yarnell et al) and U.S. Pat. No. 6,251,977 (Georget et al). Proposals have already been made on numerous occasions to use EPDM (ethylene propylene diene terpolymer) elastomers cured by organic peroxides in the manufacture of power transmission belts, because of the qualities and advantages of such elastomers such as cost, operating temperature range, and ability to withstand oxygen and ozone, such EPDM-based elastomers having additives which improve their dynamic properties such as resistance to fatigue and to wear, their breaking strength, and their modulus of elasticity, and also their adhesion to traction cords, which additives are generally constituted by metallic salts of $\alpha,\beta$-unsaturated organic acids (in particular zinc methacrylate) plus reinforcing fillers such as carbon black and possibly fibers, e.g. aramid fibers. For example, the Yarnell '217 patent teaches the use of $\alpha,\beta$-unsaturated organic acids in peroxide cured EPDM elastomers. The Georget et al '977 patent teaches the inclusion, in peroxide cured elastomers, of an elastomer grafted with maleic anhydride which reacts with the $\alpha,\beta$-unsaturated organic acid metallic salt included in the composition to reinforce the curing of the EPDM-based elastomer and to improve its dynamic characteristics, such as in particular its modulus of elasticity, its breaking strength, and its hardness. The elastomer grafted with maleic anhydride can be a polybutadiene, polyisoprene, polypropylene, or an ethyl vinyl acetate (EVA) copolymer, and the elastomer is used as a power transmission belt.

Oxidized polyethylenes are known and are taught by U.S. Pat. Nos. 2,683,141 and 3,060,163 to Erchak. They are used to form stable, translucent emulsions for use in floor waxes, in coatings for asbestos shingles, paper and textiles, and in inks for application to various surfaces. They have been incorporated into thermoplastic polypropylene compositions containing EPDM compositions, such as those described in U.S. Pat. No. 4,990,568 to Benefield et al. In Benefield a thermoplastic polypropylene is modified with EPM or EPDM and an oxidized or carboxylated polyolefin, in at an amount of 2 to 20% of the elastomer, to improve the problem of adherence of coatings applied to the surfaces of articles formed from the thermoplastic elastomers.

SUMMARY OF THE INVENTION

The present invention is the result of the discovery that the incorporation of functionalized polyethylenes into ethylene alpha olefin elastomers, such as EPDM elastomer compositions, which are cured by peroxides, will result in improved properties, such as hardness and modulus of elongation, and can result in improved higher abrasion resistance, wear resistance, coefficient of friction, tensile strength, and other properties over a wide temperature range. Enhancement of these properties is beneficial to power transmission products, such as power transmission belts. Further, the formulation results in a reduction in the viscosity of the uncured compound, resulting in easier processing.

For the purposes of this application, the "total crosslinkable material" in the rubber composition is used as the basis for the "parts per hundred rubber" (phr) calculation. The quantity of crosslinkable polyethylene in the compound is included in the phr amount. Cross-linkable material is herein defined as a material in a composition that chemically links with other material within the composition. For the purpose of this definition, co-agents and co-cures, such as peroxide, zinc methacrylate, zinc diacrylate, bis-maleimide, are not considered cross-linkable materials. Cross-linkable materials include conventional solid elastomers, liquid elastomers, and cross-linkable thermoplastic resins or waxes.

The incorporation of the functionalized polyethylene is at an amount of about 1% to 95%, with 5 to 95%, 5 to 80 and 20 to 80% by weight of the crosslinkable material being more preferred ranges. When the composition is cured by the peroxide that is included in the mixture, the functionalized polyethylene is also crosslinked into the composition, and the result is an improved belting composition.

The high ethylene content, which is beneficial in improving the pilling and wear resistance of the ribs in, e.g., v-ribbed belts, is currently achieved using ethylene alpha olefin base elastomers with high ethylene levels, i.e., elastomers having ethylene levels of greater than about 65%. Such compositions are difficult to process on conventional rubber processing equipment. The process of the present invention allows for use of easy processing low ethylene base elastomers in which the ethylene content is boosted by the functionalized polyethylene, allows the use of smaller amounts of high ethylene elastomer, and enables the increase in low extension modulus of the compound. Thus, the belt properties are improved without a negative impact on processing.

DETAILED DESCRIPTION OF THE INVENTION

Figure 1:
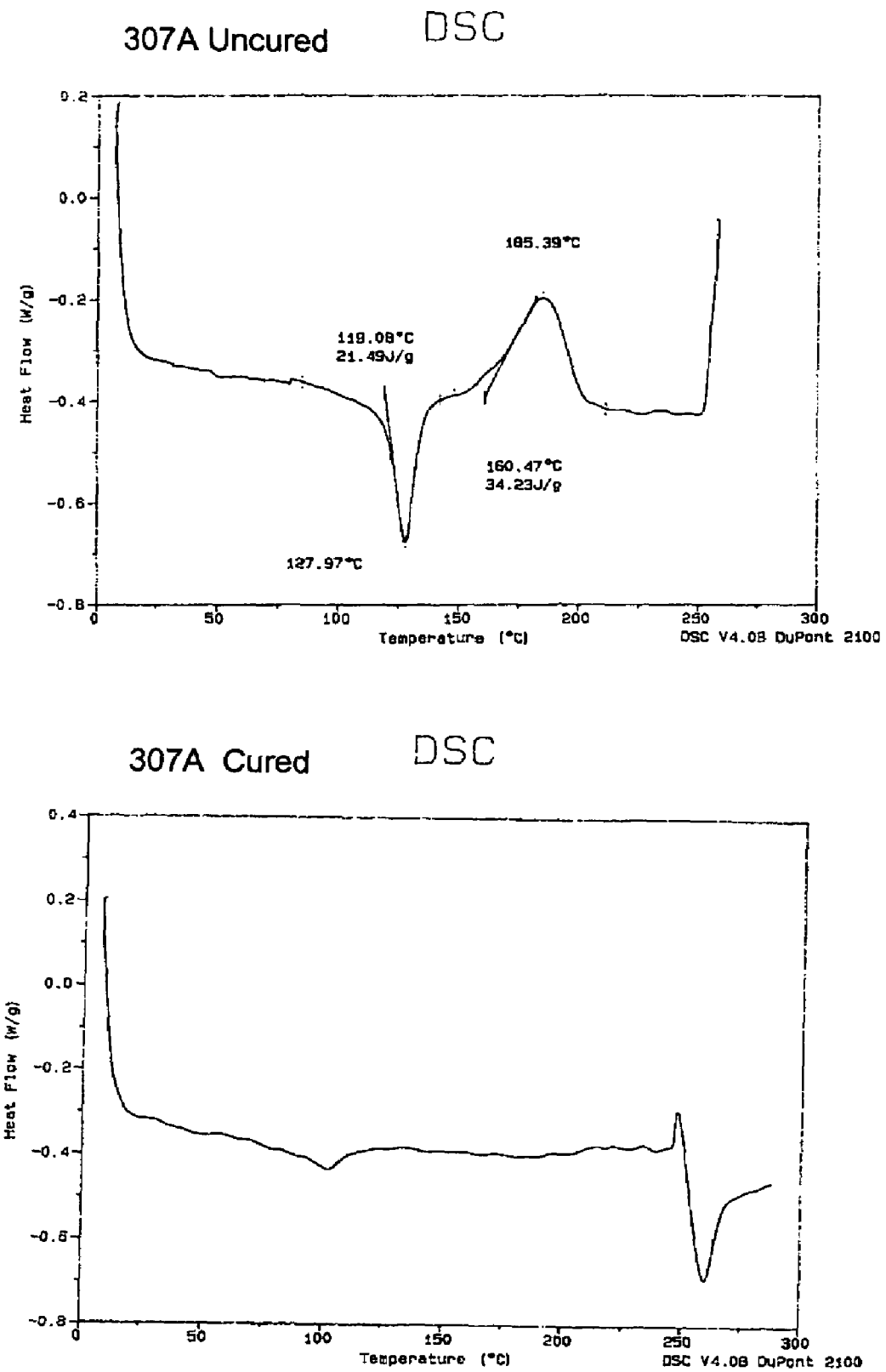
FIG. 1 is a differential scanning calorimeter graph of the exotherms of uncured versus cured compounds of a composition containing functionalized polyethylene.

The present invention is directed to improved power transmission products, such as transmission belts, timing belts, and the like. The invention will be described with reference to power transmission belts, but could be applied to other structures, and so are not limited thereto. The structures of power transmission belts are well know and illustrated in patents such as U.S. Pat. Nos. 6,251,977, 6,561,937, and 5,610,217, the disclosures of which are incorporated herein by reference. The belt is designed to rotate any rotary member, and can be of the "poly-V" type. As such it would have an inside surface and a certain number of circumferential ribs of trapezoidal cross-section, where the ribs are mutually parallel and extend over the entire length of the belt and are designed to be engaged in grooves of complementary shape in the pulleys on which the belt is mounted.

The belt has at least one sheet of traction cords which are embedded in the ethylene-alpha-olefin elastomer of the belt, between its top surface and the ribs, with the cords being spiral-wound inside the belt and with the number of turns thereof being a function of the mechanical characteristics desired of the belt.

The ethylene-alpha-olefin elastomers useful in the present invention include but are not limited to copolymers composed of ethylene and propylene units (EPM), ethylene and butene units, ethylene and pentene units, or ethylene and octene units (EOM), and terpolymers composed of ethylene and propylene units and an unsaturated component (EPDM), as well as mixtures thereof. As the unsaturated component of EPDM, any appropriate non-conjugated diene may be used, including for example, 1,4-hexadiene, dicyclopentadiene or ethylidenenorbornene (ENB). The ethylene-alpha-olefin elastomer preferred in the present invention contains from about 35% by weight to about 80% by weight of the ethylene unit, from about 65% by weight to about 25% by weight of the propylene or octene unit, and 0-10% by weight of the unsaturated component. In a more preferred embodiment, the ethylene-alpha-olefin elastomer contains from about 55% to about 78% by weight of the ethylene unit, and in a most preferred embodiment, the ethylene-alpha-olefin elastomer contains from about 65% to about 75% of the ethylene unit. At these more preferred ethylene unit content levels, endless belts incorporating as their main belt body portions the ethylene-alpha-olefin elastomeric compositions of this preferred embodiment of the present invention exhibit improved pilling resistance. The most preferred ethylene-alpha-olefin elastomers are EPM and/or EPDM.

To form the elastomer composition of the present invention the ethylene-alpha-olefin elastomer may optionally be blended with less than 50% by weight, more preferably up to about 25%, and most preferably from about 5% to about 10% based on the total crosslinkable material of a second elastomeric material including but not limited to silicone rubber, polychloroprene, epichlorohydrin, hydrogenated nitrile butadiene rubber, natural rubber, ethylene-vinyl-acetate copolymer, ethylene methacrylate copolymers and terpolymers, styrene butadiene rubber, nitrile rubber, chlorinated polyethylene, chlorosulfonated polyethylene, alkylated chlorosulfonated polyethylene, transpolyoctenamer, polyacrylic rubbers, butadiene rubber, and mixtures thereof, to fine-tune certain mechanical properties such as high temperature performance and tack. For example, the composition of the elastomer of the invention may also be blended with:

hydrogenated nitrile butadiene rubber (HNBR) constituting 2 to 20 phr approximately to improve resistance to oils and to solvents, or nitrile butadiene rubber (NBR) in the same quantities and for the same purpose;

polybutadiene (BR) constituting 2 to 20 phr approximately to improve dynamic properties and resistance to abrasion;

chloro-sulfonated polyethylene with alkyl groups (ACSM) constituting 2 to 40 phr approximately to increase resistance to oils and resistance to tearing; and natural rubber comprising about 2 to 20 phr to improve raw adhesion.

The elastomer may incorporate metal salts of $\alpha,\beta$-unsaturated organic acids. The metal salts of $\alpha,\beta$-unsaturated organic acids that can be useful in the present invention are metal salts of acids such as for example, acrylic, methacrylic, maleic, fumaric, ethacrylic, vinyl-acrylic, itaconic, methyl itaconic, aconitic, methyl aconitic, crotonic, alpha-methylcrotonic, cinnamic, and 2,4-dihydroxy cinnamic acids. These salts may be of zinc, cadmium, calcium, magnesium, sodium or aluminum, and are preferably those of zinc. The preferred metal salts of $\alpha,\beta$-unsaturated organic acids are zinc diacrylate and zinc dimethacrylate. The most preferred metal salt of unsaturated organic acid is zinc dimethacrylate. Amounts of the metal salt useful in the present invention may range from about 1 to about 30 phr, and are preferably from about 5 to about 20 phr. In the most preferred embodiment, the metal salt is zinc dimethacrylate used in an amount of about 5 phr when used in conjunction with EPDM mixed with up to about 10% of silicone rubber, and from about 10 to about 20 phr and more preferably about 15 phr when used in conjunction with the other ethylene-alpha-olefin elastomers useful in the present invention.

The functionalized polyethylenes that can be employed in the present invention include oxidized polyethylenes and copolymers of polyethylene, such as ethylene maleic anhydride and ethylene-vinyl acetate copolymers, which will crosslink with the elastomer to increase the hardness and modulus of the elastomer, which in turn, leads to improved belt properties, especially for power transmission belts. The preferred functionalized polyethylenes include oxidized polyethylene, ethylene-vinyl acetate copolymer, and ethylene maleic anhydride copolymer. Functionalized polyethylenes are available from Honeywell International Inc. under the brand name A-C® polyethylene, including A-C® 307, 307A, 395, and 395A, which are oxidized polyethylenes, A-C® 400 and 400A, which are ethylene-vinyl acetate copolymers, and A-C® 575P and 575A, which are ethylene-maleic anhydride copolymers.

Oxidized polyethylene wax materials suitable for use in the practice of this invention are described in U.S. Pat. Nos. 2,683,141 and 3,060,163, which are incorporated herein by reference. According to the latter patent, normally solid, hard, waxy polymers of ethylene having an average molecular weight between about 1,000 and 3,000 are subjected, in the liquid phase, to the action of an oxygen-containing gas to cause reaction of between 2-17 pounds of oxygen per 100 pounds of wax, i.e. to provide an oxidized polyethylene wax containing at least 1 percent and preferably 1-8 percent by weight of oxygen, and acid numbers of not more than about 50, and preferably between 10 and 45.

The oxidized polyethylene is characterized by having a minimum number average molecular weight above 1000 and preferably at least about 1200, as determined by high temperature vapor pressure osmometry, containing between 1-5 percent by weight of total oxygen, and having an acid number of from 10 to about 35. The described oxidized polyethylene is obtained by oxidation of polyethylene in molten or finely divided solid form, with free oxygen containing gas, usually air, generally at elevated temperature, until the desired oxygen content is obtained. Starting materials for making the oxidized polyethylene suitable for use in the practice of this invention include low molecular weight, low density or linear low density polyethylene waxes having specific gravities in the range of about 0.91 to about 0.96 as, for example, prepared by the process described in U.S. Pat. No. 2,683,141, as well as high density, linear polyethylene as, for example, prepared in the presence of such well know catalysts as the "Phillips" or "Ziegler" type catalysts, having specific gravities in the range of about 0.93-0.97 or above. The low molecular weight, low density polyethylene starting material can be oxidized by contacting in the molten state with a stream of air until the desired oxygen content has been obtained. The high density, linear polyethylene starting material is usually oxidized by contact, preferably in the finely divided solid state, with free oxygen-containing gas, usually air, at temperatures ranging from 100° C. up to, but not including, the crystalline melting point of the polyethylene, until the desired oxygen content has been obtained.

The ethylene-alpha-olefin elastomeric compositions useful in the endless belts of the present invention further comprise from about 25 to about 250 phr and preferably from about 25 to about 100 phr of a reinforcing filler such as carbon black, calcium carbonate, talc, clay or hydrated silica, or mixtures of the foregoing. If desired, the incorporation of from 1 to 30 phr of a metal salt of an unsaturated organic acid and from about 25 to about 250 phr, preferably about 25 to about 100 phr, of reinforcing filler in the peroxide-cured ethylene-alpha-olefin elastomeric composition preserves the heat stability of conventional peroxide-cured elastomers, while providing the tear strength and dynamic properties usually associated with sulfur cured elastomers.

The elastomeric composition may contain from 0.1 to 40 phr of an acrylated polybutadiene. Preferably, from 1 to 10 phr is present. The polybutadiene may be a random polybutadiene polymer containing both 1,4 and 1,2 butadiene units. The amount of 1,2 vinyl bonds may range from 15 to about 90 percent by weight of the acrylated polybutadiene. Preferably, from 20 to 70 percent by weight of 1,2 vinyl bonds are present. The acrylated polybutadiene may be prepared from a Ziegler Natta polymerization. The acrylated polybutadiene may have a molecular weight ($M_N$) ranging from 500 to 500,000. Preferably, the molecular weight ranges from 1,000 to 70,000. Preferred acrylated polybutadienes are sold by Sartomer Company, Inc., under the trademark RICACRYL. A specific example is RICACRYL 3500 (mol weight $M_N$ of approximately 6400 and a Brookfield viscosity of approximately 50,000 centipoise). Acrylated polybutadienes may be used with acrylates and methacrylates, e.g., trimethylolpropane trimethacrylate (TMPTMA), which is available as SR® 350 from Sartomer Company, Inc., in amounts of from 0.1 to 50 phr (preferably 1-20 phr) to make up a coagent system. Other examples are set forth in U.S. Pat. No. 6,491,598 to Rosenboom, the disclosure of which is incorporated herein by reference.

The free-radical producing curatives useful in the present invention are those suitable for curing ethylene-alpha-olefin elastomers and include for example, organic peroxides and ionizing radiation. The preferred curative is an organic peroxide, including but not limited to dicumyl peroxide, bis-(t-butyl peroxy-diisopropyl benzene, t-butyl perbenzoate, di-t-butyl peroxide, 2,5-dimethyl-2,5-di-t-butylperoxyhexane, alpha-alpha-bis(t-butylperoxy) diisopropylbenzene. The preferred organic peroxide curative is alpha-alpha-bis(t-butylperoxy) diisopropylbenzene. Cure-effective amounts of organic peroxide for purposes of the present invention are typically from about 2 to about 15 phr. Preferred levels of organic peroxide are from about 4 to about 12 phr. Sulfur may optionally be added to the organic peroxide curative as part of a mixed cure system in an amount of from about 0.01 to about 1.0 phr, to improve the cured elastomer's Young's modulus without negatively affecting its tear resistance.

Other conventional ethylene-alpha-olefin elastomer additives, process and extender oils, antioxidants, waxes, pigments, plasticizers, softeners and the like may be added according to common rubber processing practice without departing from the present invention. For example, in a preferred embodiment of the present invention, the elastomeric composition also contains from about 0.5 to about 1.5 phr of an antiozonant or antioxidant and from about 5 to about 15 phr of a paraffinic petroleum oil plasticizer/softener.

The ethylene-alpha-olefin elastomeric compositions useful in the present invention may be prepared by any conventional procedure such as for example, by mixing and milling the ingredients in an internal mixer or mill. It should be noted that in blending some of the functionalized polyethylenes, attaining temperatures above the melting point of the polyethylene grade may be necessary to achieve processing of the mixed materials, and thus a uniform blend.

Typically, a belt made out of an EPDM elastomer of the invention has the following composition prior to curing:

EPDM: 99 to 20% by weight of the total crosslinkable material;
functionalized polyethylene: 1 to 80% (preferable: 5 to 70%) by weight of the total crosslinkable material;
carbon black: 5 to 100 phr (preferable: 50 to 60 phr);
electrically conductive carbon black: 0 to 15 phr (preferable: 5 to 10 phr);
antioxidant: 0.5 to 8 phr (preferable: 1.5 to 3 phr);
organic peroxide: 0.5 to 15 phr (preferable: 2 to 12 phr);
curing coagent: 0.5 to 10 phr (1 to 8 phr);
plasticizer: 0 to 20 phr (preferable: 1 to 10 phr).

In addition, it may also have polyamide, aramid, polyester, rayon, cotton, carbon, or glass fibers constituting 3 to 30 phr approximately to improve the tensile and low extension modulus.

EXAMPLE

In order to demonstrate the present invention, belt compositions were made and tested. The following composition was mixed and compounded in a two stage Banbury mixer in a manner typical for rubber compounding:

EPDM: 84.4% by weight of crosslinkable material;
functionalized polyethylene: 15.6% by weight of crosslinkable material;
carbon black: 42 phr;
dicumyl peroxide: 8.4 phr The compositions were made into sheets, cured at about 340° F., for about 30 minutes, and evaluated using the Rubber Processability Analyzer and physical properties on cured samples using ASTM procedures. The results are set forth in Tables I and II.

TABLE I

| Example No. | Functionalized Polyethylene Employed | sg (g/cc) | Mettler Drop Point (° F.) | RPA 2000 Rubber Process Analyzer "Cure" Data | | |
|---|---|---|---|---|---|---|
| | | | | Min S' (dNm) | Max S' (dNm) | Max S' − Min S' (dNm) |
| 1 | None | | | 3.266 | 34.96 | 31.70 |
| 2 | A-C ® 307A Oxidized Polyethylene | 0.98 | 284 | 2.32 | 31.76 | 29.44 |
| 3 | A-C ® 395A Oxidized Polyethylene | 1.00 | 279 | 2.33 | 25.31 | 22.98 |
| 4 | A-C ® 575A Ethylene-Maleic Anhydride Copolymer | 0.92 | 223 | 2.239 | 27.11 | 24.87 |

Note:
A-C ® polyethylenes & copolymers are available from Honeywell International, Inc.

TABLE II

| TEST | CONTROL | A-C® 575A Example | A-C® 307A Example |
|---|---|---|---|
| Tensile Strength; Psi (MPa) | 1460.3 (10.1 MPa) | 1392.8 (9.6) | 1667.8 (11.5) |
| Elongation (%) | 141 | 175 | 156 |
| Modulus (MPa) | | | |
| 10%; Psi | 64.9 (0.45 MPa) | 116.5 (0.8) | 203.9 (1.41) |
| 25% | 138.7 (0.96) | 215.5 (1.48) | 343.2 (2.37) |
| 50% | 246.2 (1.7) | 322.3 (2.22) | 492.7 (3.4) |
| 100% | 712.9 (4.92) | 609.3 (4.2) | 903.8 (6.23) |
| 141% | 1460.3 (10.1) | | |
| 156% | | | 1667.8 (11.5) |
| 175% | | 1392.8 (9.6) | |
| Hardness (Shore A) | 66 | 73 | 80 |

From the data above, the blends have lowered S'min (indicator of improved processing). Tensile strength, elongation, modulus, hardness are increased resulting in a more useful compound.

Figure 2:
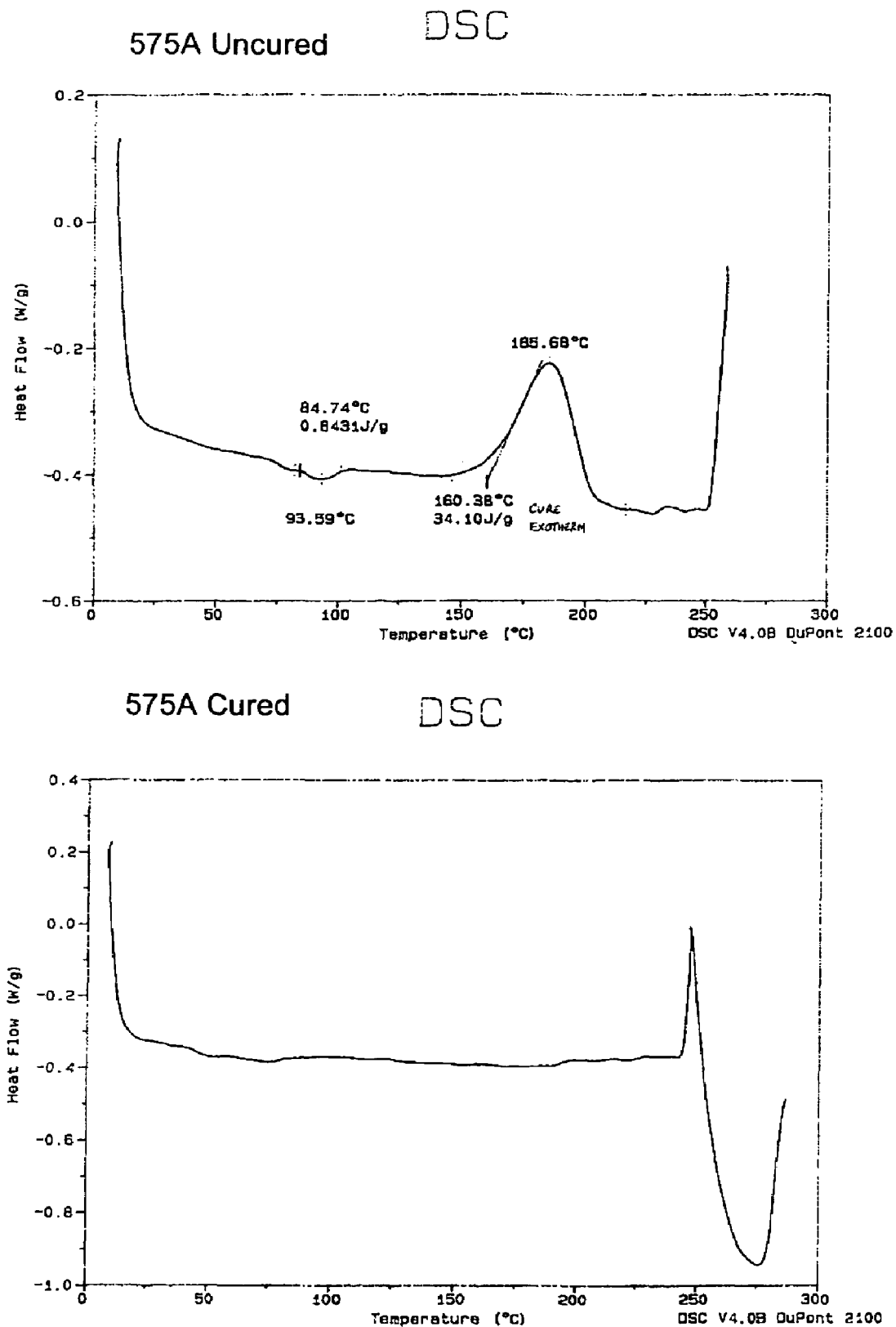
FIG. 2 is a differential scanning calorimeter graph, similar to FIG. 1, of the exotherms of uncured versus cured compounds of a composition containing another functionalized polyethylene.

As can be seen from the data above and the DSC (differential scanning calorimeter) scans shown in FIGS. 1 and 2, the functionalized polyethylene is crosslinked with the EPDM. The resulting composition would provide improved properties for the belting material.

The DSC scans of uncured A-C® 307A compound, FIG. 1, and A-C® 575A compound, FIG. 2, show melt point peaks for the functionalized polyethylenes at 127.97° C. and 93.59° C. respectively, along with the DiCup cure exotherm at 185-186° C. The same melt point peaks are absent from the DSC scans of cured samples of these compounds and show that the functionalized polyethylenes are crosslinked into the compounds on cure.

The foregoing embodiments of the present invention have been presented for the purposes of illustration and description. These descriptions and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated. It is intended that the invention be defined by the following claims.

What we claim is:

1. A cured elastomer composition formed by organic peroxide curing an elastomer composition comprising:
   (a) ethylene-alpha-olefin elastomer,
   (b) an organic peroxide curing agent in an amount of 2 to 15 parts per hundred of crosslinkable material (phr) to cure the composition, and
   (c) 20 to 80% by weight based upon the total weight of crosslinkable material, of an ethylene maleic anhydride copolymer whereby the ethylene maleic anhydride copolymer is crosslinked into the composition on cure, and wherein the cured compound is in the form of a power transmission belt.

2. The cured elastomer composition of claim 1 wherein ethylene-alpha-olefin elastomer is ethylene-propylene copolymer.

3. The cured elastomer composition of claim 1 wherein ethylene-alpha-olefin elastomer is ethylene-propylene-diene terpolymer.

4. The cured elastomer composition of claim 1 wherein the cured composition is in the form of a power transmission belt selected from the group consisting of synchronous belts, v-belts, and multi-V-ribbed belts.

5. The cured elastomer composition of claim 1 wherein the composition further includes a filler.

6. The cured elastomer composition of claim 1 wherein the composition further includes a reinforcing fiber.

7. The cured elastomer composition of claim 1 wherein the composition further includes a metal salt of an alpha-beta-unsaturated organic acid.

8. The cured elastomer composition of claim 1 wherein the composition further includes zinc diacrylate.

9. The cured elastomer composition of claim 1 wherein the composition further includes an acrylate polybutadiene and a (meth)acrylate.

10. The cured elastomer composition of claim 1 wherein the elastomer is a blend of elastomers.

11. The cured elastomer composition of claim 1 wherein the uncured composition consists essentially of the following:
   (a) ethylene-alpha-olefin elastomer in an amount of 5% to 99% by weight of the total crosslinkable material,
   (b) a functionalized polyethyelene, selected from the group consisting of oxidized polyethylene and ethylene maleic anhydride copolymer, which is crosslinkable with the elastomer, in an amount of 20% to 80% by weight of the total crosslinkable materials, and
   (c) 2 to 15 phr of an organic peroxide curing agent to cure the composition.

12. The cured elastomer composition of claim 1 which further includes an amount of acrylated polybutadiene in the range from 1 to 10phr.

13. The cured elastomer composition of claim 12 wherein the acrylated palybutadiene has a molecular weight (MN) of from 1,000 to 70,000.

14. A cured elastomer composition formed by organic peroxide curing an elastomer composition comprising:
   (a) ethylene-alpha-olefin elastomer,
   (b) an organic peroxide curing agent in an amount of 2 to 15 parts per hundred of crosslinkable material (phr) to cure the composition,
   (c) 1 to 10 phr of acrylated polybutadiene, and
   (d) 20 to 80% by weight based upon the total weight of crosslinkable material, of an oxidized polyethylene, which is crosslinkable with the ethylene-alpha-olefin elastomer, whereby the functionalized polyethylene is crosslinked into the composition on cure.

15. The cured elastomer composition of claim 14 wherein the cured composition is in the form of a power transmission belt.

16. The cured elastomer composition of claim 15 wherein the power transmission belt selected from the group consisting of synchronous belts, v-belts, and multi-V-ribbed belts.

17. The cured elastomer composition of claim 14 wherein ethylene-alpha-olefin elastomer is ethylene-propylene copolymer.

18. The cured elastomer composition of claim 14 wherein ethylene-alpha-olefin elastomer is ethylene-propylene-diene terpolymer.

19. The cured elastomer composition of claim 14 wherein the composition further includes a reinforcing fiber.

20. The cured elastomer composition of claim 14 wherein the composition further includes zinc diacrylate.

* * * * *